(12) United States Patent
Orenshteyn

(10) Patent No.: US 6,393,569 B1
(45) Date of Patent: *May 21, 2002

(54) SECURED SYSTEM FOR ACCESSING APPLICATION SERVICES FROM A REMOTE STATION

(76) Inventor: Alexander S. Orenshteyn, 3635 Brighton Way, Reno, NV (US) 89509

( * ) Notice: Subject to any disclaimer, the term of this patent is extended or adjusted under 35 U.S.C. 154(b) by 0 days.

This patent is subject to a terminal disclaimer.

(21) Appl. No.: 09/280,264

(22) Filed: Mar. 29, 1999

Related U.S. Application Data

(63) Continuation-in-part of application No. 08/769,493, filed on Dec. 18, 1996, now Pat. No. 5,889,942.

(51) Int. Cl.[7] .................................................. G06F 9/44
(52) U.S. Cl. ...................................... 713/201; 709/203
(58) Field of Search ................................. 709/200–253, 709/310–332; 713/201

(56) References Cited

U.S. PATENT DOCUMENTS

| | | | | |
|---|---|---|---|---|
| 5,572,643 A | * | 11/1996 | Judson | 709/218 |
| 5,596,714 A | * | 1/1997 | Connell | 714/38 |
| 5,642,515 A | * | 6/1997 | Jones et al. | 710/220 |

* cited by examiner

Primary Examiner—St. John Courtenay, III

(57) ABSTRACT

A secured system for accessing application services from at least one application program where at least one client station having low-level application independent logics stored therein and at least one controller for controlling the low-level application independent logics, the low-level application logics including a user interface logic, a device control logic for controlling devices, a file system logic, and a communication interface logic, and wherein at least one client station has means to restrict access to said application independent logics, at least one application server having high-level application logic stored in a server device for running at least one application program, the server device being coupled to said at least one application server and low-level interface between said at least one client station and said at least one server for connecting said at least one client station to said at least one application server, wherein upon accessing by said at least one client station, said at least one application server runs at least one application program which selectively controls said low-level application independent logics for controlling devices of said at least one client station and accessing data of said at least one client station without permanently storing said at least one client station data in said at least one server. There is also a description of a secure operating system and method and a secured system and method of construction of a computer system as well as description of system and method of how to preserve a running current state of an application program for security and relocation purpose.

26 Claims, 8 Drawing Sheets

SECURED SYSTEM FOR ACCESSING APPLICATION SERVICES FROM A REMOTE STATION

The present application is a continuation in part of application Ser. No. 08/769,493 filed Dec. 18, 1996, now U.S. Pat. No. 5,889,942.

FIELD OF THE INVENTION

The invention relates generally to a reciprocal client-server network system and, more particularly, to a secured system and method for obtaining application services (i.e., embedded services/applications) from a server and for delivering such services to the requesting client/desktop device, where the service's application logic (high-level presentation, business and database logic) is independent from the client's low-level operating system and I/O peripheral devices and where client device has means to restrict access to its resources.

BACKGROUND OF THE INVENTION

As we are looking forward to year 2000 and beyond, a question arises. How will computing look in the future? The trends we have seen are obvious; more powerful chips are being released every few months, while software development struggles to keep up with the hardware but never does. Of course, we now have a slightly new twist, i.e. the new found popularity of Internet, the web, and JAVA® code (developed by SUN®). For instance, with respect to the web, typically a server downloads code (e.g. graphics, JAVA applets) to a general purpose computer, and the computer's browser software interprets the codes for display. However, interpreting and downloading the code takes significant time.

Some have said that JAVA (being platform independent) has finally brought a tool to the computer market to break the major chip and operating system (OS) dominance which have developed in the desktop industry, via INTEL® and MICROSOFT®, respectively. However, different software vendors are creating their own JAVA extensions, such that JAVA is losing its portability. For example, MICROSOFT has developed its own JAVA dialect/interpreter, MS J ++® with extensions specific to the MICROSOFT web browser EXPLORER® and other related MICROSOFT technology, such as ACTIVE-X®.

Further, we have seen neither INTEL nor MICROSOFT despair about web development, i.e., they do not see the currently available Internet technologies as able to threaten their respective monopolies, as "Intel Inside" will continue to power general purpose PCs and MICROSOFT's OSs will continue to manage them, while its MICROSOFT web-browser EXPLORER® now supports JAVA code. Further, MICROSOFT's proprietary ACTIVE-X or Active Server Pages (ASP) technology is a JAVA competitor which may yet derail the industry's effort to use open standards. Accordingly, INTEL's and MICROSOFT's dominance remains the same.

It has been predicted that computing, especially network computing, will change so drastically in the near future that no company/vendor would be able to dominate any market but the current efforts by many software vendors to "extend" the JAVA standards is putting that prediction in doubt. As JAVA applets get developed, incorporating non-standard extensions will eventually cause the emergence of another yet another dominant JAVA applet supplier. At this point, there is little doubt it is going to be the current software giant MICROSOFT. By modifying its proprietary operating systems, like Windows 95/98/2000 and Windows NT to more effectively process either JAVA applets with proprietary extensions or ACTIVE-X objects, or even introducing a completely new Java-like language MICROSOFT once again will dominate software application development by divide and conquer approach.

General purpose computing on the desktop, i.e., desktops having a standard OS (such as Windows 98/95®) and a microprocessor (such as the Pentium® chip), has to be replaced by a system which is less expensive to own and maintain but at the same time does not short-change the user by taking away features which we all have come to expect from our PCs, such as flexibility, extendibility, high-security, ease-of-use, and reasonable cost of initial ownership to enable the software and hardware industry to proceed forward in new and creative ways.

Foreseeable disadvantages of the standard general purpose PC or Network Computers (NC), with respect to the networks and JAVA, include the following. JAVA applications will increase in complexity, therefore requiring faster processors and greater memory in the desktop unit to run them (the same problem which PCs have always had) again forcing the user into a never-ending spiral of hardware and software upgrades. Currently, JAVA applets are four to five times slower than compiled code, requiring more powerful processors to get similar performance as compared to an application that runs native binary code. Further, converting applications from another high-level language to JAVA (or even from C ++) is a very expensive, labor-intensive effort, so that it is no wonder that legacy COBOL applications are still often used in business instead of being rewritten in another language. If it is taking billions and billions of dollars to fix a small Y2K problem it would take trillions of dollars to rewrite the huge number of existing applications in some Java-like language and even more to upgrade all the hardware.

It is also a concern that the computer's writable resources, e.g. a hard drive, can be compromised or damaged by rogue JAVA applets or your computer resources can be used in many insecure and unauthorized ways. On the other hand, if the computer has no writable resources, then the user typically keeps his or her files in remote locations, e.g. on a remote file server, thereby making the user's data files a security risk which no company can afford. An example of a computer having no writable resources is the proposed Network Computer "NC" (a joint effort by APPLE®, NETSCAPE®, IBM®, ORACLE® and SUN®). Although some effort has been made to add digital certificates to Java applets, the companies issuing those certificates are NOT willing to accept any legal responsibility for fraud and do not have the resources to verify if they issue certificates to the right person or company. Therefore the potential for impersonation, fraud and loss of business data to damage or copying is enormous with Java, Active-X or other Java-like approaches.

A typical network system having server-client architecture, which can be utilized in the present invention, would include a network having at least one server connected to at least one client over a shared transmission medium. The network is applicable to supporting the transmission of data on a local area network (LAN) or on a wide area network (WAN).

A typical server, which can be utilized in the present invention, may vary substantially in its architecture. It may be a uni- or multi-processor machine, a PC or a mainframe, a workstation from a major manufacturer or a proprietary technology based computer, etc. It may even be a special function device without any OS or software. The server should be able, however, to function in a predefined way or to run whatever software that the company which owns the server needs to run on it. It should also be able to comply with standard transport protocol, such as tcp/ip used by the Internet or other transport protocols used on wireless or wired LANs.

The server used in the present invention may have its own file system for storing service-related files and data or server may strictly be a computational server whose software is loaded from the file system of another server, i.e., a file server or file system of super-client (neither shown), which is preferable for security reasons. If the server loads its software from a super-client or a file server then the server needs to run a program/application loader which can accept application code from some pre-determined port and load it into memory for execution. A security protocol and loading protocol would need to be established between a super-client and the server to insure that the super-client is authorized to load software applications into the server. If the computational server runs the booted programs solely from RAM, then it would not have access to its local file system after the software is loaded into its main memory (RAM).

There are three basic conventional computing architectures. A two-tier architecture can be either a set of terminals attached to a central computer or a set of computational clients attached to a central file server. In addition to the described two-tier computing configurations, a three- or N-tier computing configuration may also be utilized.

Conventionally, in a first major configuration, the client stations are essentially "dumb" terminals connected to a central server via a transmission medium. The central server contains the client users' data and the application/program code. Further, the central server executes all the programs for its clients.

Substantially all of the application logic (i.e., presentation logic, business logic, and database logic) is resident within the central server. Such application logic (presentation, business, database) includes any program logic concerned with delivering and/or executing the application service. Note, however, that each client may harbor some low-level graphical interface logic such as X11 protocol. These clients are diskless and perform no general computational tasks and do not usually have any devices other than the display which are accessible to applications. Further, the database (file system) logic on the server is shared among the clients. An example of such a system is a set of X-terminals attached to a central computer/server.

In a second major configuration, the central server contains both the program code and the file system which the clients use, as with the first configuration, but does not execute any applications. Instead, the applications are downloaded into each requesting client through the network and run on each client. The client, however, continues using the central server as the client database/file system source. The clients in this configuration are usually diskless but do contain powerful CPUs, such as by SPARC®, MIPS® and ALPHA®. Although all of the presentation, business and database logic (while running) reside on the client, the file system is located on the central server and is shared among the clients. An example of the second configuration include a LAN with a central database such as ORACLE, Informix or Sybase running on an IBM AS/100 file server and set of diskless desktop machines like SUN or RS6000 workstations using a central file server to get their program code and data.

Further, the proposed NC (Network Computer) is similar to the second conventional configuration, except that instead of loading native machine code onto a client, JAVA code is sent to be either interpreted or compiled on-the-fly into native code at the client station. That is, the JAVA code is either interpreted by the browser software on the client or the browser first compiles the JAVA code, then runs it. The obvious problems with this solution are that interpreted code and compilation is slow, and as the complexity of JAVA code increases, the CPU/memory combination of the NC or general purpose PC/browser combination would also have to increase in computational power and memory size to accommodate the growth. Further, JAVA code would arrive to the desktop in source form making it very difficult to determine whether malfunctions or bugs are associated with the JAVA applet or the browser software itself.

In addition, since the JAVA code is supplied to run on the client, an application foreign to the client is accepted which may potentially damage the PC's writable resources by malice or mistake (e.g., by utilizing security holes in the browsers) or utilize resources on the client which the client user may not want to be accessible. Further, the NC fails to protect the user's private data from other clients since it lacks local storage and all client data has to reside in a central location. JAVA also makes copyright enforcement an extremely difficult task for the software vendors. Since JAVA applets have absolutely no protection from being copied by the client/user machine, as they are delivered in source form or easily decompilable byte code.

In a third conventional configuration, a three- or N-tier computing network is employed. Such a configuration is currently being utilized by Forte Technologies. They offer programming tools to decompose client-server application into presentation logic which runs on each client, business logic which runs on the central server and database logic which runs on a file server (not shown). However, the business and database logic may run on the same physical server. As with the first and second configurations, the client's database/file system logic is stored remotely from the client, as it is shared among the clients, and thus poses a security risk. Since the presentation logic runs on the client, this system is also faces with the problem of constant upgrades and high maintenance costs of the client stations. Another great problem in this model is that application codes have to be written specifically to one software vendor's implementation of the N-tier network and a user is typically forced to license and distribute parts of the system to run his own applications.

SUMMARY OF THE INVENTION

It is therefore an object of the present invention to overcome the disadvantages of the prior art.

There is provided a system and method of accessing application services from selected application programs, stored and run on a remote compute-server, while the application program utilizes the clients' operating-system-level services such as storage devices for its permanent storage requirements and other devices for other services.

At least one remote server uses the client as a peripheral device for the purpose of I/O interfacing to the client's keyboard, mouse, monitor, file system or any other client-attached peripheral device and for controlling those attached devices.

In particular, the system includes at least one client station, each having user interface (e.g., a graphical user interface (GUI)) and file I/O logic stored therein and at least one controller circuit (e.g., a digital signal processor (DSP)) for controlling the client's I/O peripheral devices. The file I/O logic is capable of storing and retrieving data corresponding to the application programs and otherwise perform low-level file control operations on the file system and specifically on the device files. Further, the controller operates the user interface, device control, communication interface and file I/O logics.

In addition, the system includes at least one specialized remote application server. Each server includes high-level application logic stored therein for running the corresponding application program or stored in a corresponding file server. A low-level interface (e.g., an operating system service interface (OSSI)) establishes a common protocol for connecting each client to each server. OSSI protocol insulates high-level application logic from direct access to the underlying operating system, thus allowing a high-level application to obtain OSSI services from different operating systems or from special console devices which understand OSSI protocol. OSSI makes it possible for a high-level application to use OS-level services on a remote client station separated by a network.

In operation, upon initiation by a client, a selected server spawns a selected application running thereon and selectively accesses logics of the client station to control the file system, devices, user interface and communication interface and to access the corresponding data of the requesting client. The client station should include some means to refuse access by the selected application running on a server to any specific logic or a group of logics based on the application and any other data available to the client station. Thus, the client acts as a peripheral device (a "window on the world") for the selected service application running remotely on the server. In turn, the remote server processes the corresponding data from the client (and on behalf of the client) through the spawned service application without permanently storing the data within the server. In other words, the client serves file systems, screens, keyboards, mouse, other attached devices to a server, while the server serves to the client application logic and compute-power.

In addition, a "directory" service application may be used which resides on the server such that the client may launch the selected application via the directory service. "Directory" service applications may perform small services directly (e.g., display some textual or graphical information), refer to another service application on the same server, or reference an application service on another server. In this manner, multiple directory services may be chained together so that the client user can reference multiple applications by different vendors, residing on different servers. By chaining "directory" service applications in the above manner, a network of various application services can be readily available to the client. A user can "roam" the network of "directory" services until he/she finds the appropriate application for this task. In addition, search engines could also be employed. Once found, an application Internet address and port can be recorded for future use in the client configuration database/file.

The applications on the remote servers are not dependent on, and thus preferably not written for, any specific client OS. Thus, the application logic is separated from the client's low-level "quasi" OS logic. In other words, the application does not link directly with the client's kernel-level services (of the OS) to perform the desired functions. Instead, the application prepares a desired "command packet" (representing the desired function and necessary data) by calling an appropriate command function from the server's function library. The command function from the server's library encodes the command packet according to OSSI protocol. The command packet is then dispatched to the client's quasi-OS via the common transport protocol (such as tcp/ip). The client's quasi-OS can recognize the received, OSSI encoded, packets for performing the desired I/O or control operations.

Further, the quasi-OS has the flexibility to tailor its action in response to a specific "command packet" according to its own abilities or to the abilities of the devices to which it has access. Therefore, specific logical commands from an application may be executed differently depending on in what environment the quasi-OS exists. If X11 is used for the GUI, then the application will look and feel like an "X" application. Similarly, if another GUI is used (e.g., Windows 95), then the application will look and feel like a Windows 95 application.

This invention differs from all three conventional models, discussed above, in the following major ways. The invention enables selected, restricted access from the application on the remote server to the client's permanent storage facilities, such as the hard drives, CD-ROM drives, tape drives, floppy drives, and any other I/O or other device which may be attached to the client. In other words, the remote servers perform operations on the client's local data and devices. Thus, the server can process the data from the client; however, the data does not reside permanently on the server. At the same time the client station is able to limit access to its various logics by the server depending on the server, application, and any other data available to the client station.

Local data is simply read from or written to various client station devices or the client file system as required by the application logic.

All of the above conventional models employ a centralized file system on the server, so that the file system is shared between the clients. Accordingly, a rogue client can gain unauthorized access to another client's data through the shared file system. The present invention, however, does not share a file system among different clients but stores client's data in the attached storage devices such that they are inaccessible (without explicit authorization from the user) to other clients or servers.

Further, in the present invention, if more than one client uses the same application during the same time period, then each client can make certain files and devices accessible by the application on the server at the same time which, if the application permits, may enable distributed cooperative projects between consenting clients, i.e. the consenting clients may share devices, files and data.

Illustratively, the invention prohibits running substantially any application logic on the client. While the first conventional configuration with "dumb terminals" does not run any application logic on the terminal it is also unable to provide storage or any devices other than display and keyboard and it is unable to provide any operating system services to an application. The second conventional configuration executes all application logic on the client side, while the third conventional configuration executes high-level presentation and business logic on the client. Further, the application depends on a high-level interface between the client and server parts of the application, and predetermined platform compatibility.

Since the present invention removes all application logic from the client station while the client station still providing operating system services, there is no longer any need to execute any general purpose code (application) on the client station. The remote servers are wholly dependent on the connected clients to serve the client's I/O peripheral devices, therefore the servers do not need any hardware devices of their own to get the I/O services which the client stations can provide. Therefore, expensive general purpose processing CPUs are preferably replaced with inexpensive but powerful controllers, such as DSP chips. Despite the fact that the present invention does not have any application logic on the client station, it feels in its use like a general purpose PC that runs the application program directly on the PC. The inventive client station can connect to many different servers at the same time with each server performing some specialized application. A single client station can share many different applications/servers (software or hardware) with other client stations and many applications/servers can share the client station's operating system level services. The inventive client station allows the client user to keep his or her private data on their own disk, and it can have all the common I/O devices attached to it, such as CD-ROM and floppy drives, as well as other peripherals such as printers, plotters and the like.

Another major weakness of the above three conventional configurations is the centralized database/file systems. Giving access to a server's central file system may be a workable solution in the corporate Internet environment, where every user is known and verified (although it is also known that many security breaches are orchestrated by insiders) and can be tracked, but fails completely in the anonymous environment of the Internet. The present invention does not suffer from the same drawback. Since the server application always utilizes the file system on the client, the client has no access to the server's file system at all and therefore, can do no damage either through malice or mistake. The client merely connects to a port on the server and can typically only view whether the server is accepting its requests for services (via an application). In addition, the server (a compute-server) may not have a file system at all to be damaged but instead, may boot the appropriate application from another server (e.g., a corresponding file server or super-client). In such a case, the file server may disconnect from the compute-server, while the application runs within the compute-server's memory (RAM). Special purpose hardware chips such as ASICs or FPGAs can also be utilized as specialized servers.

Another advantage of having the file I/O logic locally on the client is that every client can insure the integrity of its data with backups and the like. This eliminates a lot of problems for service providers who would otherwise be responsible for keeping the client's program data safe from corruption or intrusion by third parties. One can easily see that in the Internet arena, it is simply impossible to accommodate unlimited members of users because of simple limitations like disk space in the server. In the present invention, however, only the computational resources are shared, so many more users can be accommodated. Further, by having a compute-server access local file systems of its clients, the performance of the server is also improved since typically the file I/O in centralized file systems is the "bottle-neck" for (i.e., reduces) computational performance. Since in this invention the server sees multiple file systems on different client stations, there is no competition for the limited storage resources or bandwidth by different client stations or applications.

Further, the application service can be delivered to a new user instantly, instead of having to set up either security groups or user IDs. (The present invention offers structural security.) In other words, such conventional security is not necessary (unless for billing purposes) since the client's data can not be accessed without authorization and the server's applications and data can not be copied or damaged as it is never sent to the requesting clients. Further, each client can receive services anonymously since the application data, specific to the client, resides on the client's file system or available from the client station's devices and the client stations do no ever gain privileges to access the server file system. The possibility of receiving services anonymously is very valuable because of privacy concerns with respect to using the internet.

In addition, although the client serves its file system and devices, it is the client station which establishes the connection to the servers. There is no mechanism for the servers to obtain a connection to a client station unless the client station is actively seeking to connect. Therefore, a potential intruder has no way to gain entry into the client's file system. So although the client serves its files, devices (i.e. data), it serves them only to servers to which the client itself connected.

Preferably, the firmware which runs on the client (stored in ROM) in the present invention is not user-modifiable since no general purpose computing will be done locally on the client. Accordingly, expensive, power and memory hungry general purpose operating systems (OS) are unnecessary since user programs/processes need not be loaded or managed. Only a small quasi-OS is required to be stored in the firmware, such that the authorized server can control all of the client I/O and file system. The operating environment is called quasi-OS because it does not load or run user processes as a conventional operating system (OS) does. Of course any part of the client station can be implemented in hardware as specialized circuits. For example, the graphical user interface, controlled by the quasi-OS, may be based on the X11 protocol, which is in the public domain.

Since neither conventional general purpose CPUs nor OSs are required in the present invention, a client becomes a long term investment for the consumer since such client stations could operate adequately for ten years or longer. On the other hand, since the second and third conventional configurations have either all or part of the business/application logic residing on the client, the user is invariably forced to upgrade the system to run more complex and fatter applications. And the central server with "dumb" terminals conventional configuration requires upgrading the servers a lot more often.

In addition, with respect to the server, the present invention preferably curtails common services like telnet, ftp, rsh, rlogin. The server is therefore left with specialized application services which do not allow access to command shells. This creates a very secure system that is substantially impervious to outside attack, yet flexible enough to offer services to the anonymous masses of the Internet. Since applications running on the servers are controlled by the server owner and operating system services are obtained from the client stations, the server software/hardware is structurally secure from any client station. The server applications enable the client stations to obtain application services without compromising security of the server.

Lastly, in the present invention, an application program need be developed only once. After the most appropriate hardware is chosen for the server (it could be designed specifically for the application), the application is developed and, instead of selling the software to run on different platforms, the application need only be set up as a service having a common Internet transport protocol, such as tcp (or udp)/ip, and attached to a network. Since the client contains no application specific logic, any application could use the client for accessing device, display and file services. The client's quasi-OS has the flexibility to interpret the command packets received from the connected server according to its local capabilities, so that if the client has a text-only display, then the quasi-OS will display information in a text mode. If X11 is used, then X functionality would be employed. However, if Windows is the underlying OS, then Windows facilities would be utilized. The look, feel and capabilities of any application will be adapting to the look, feel and capabilities of quasi-OS. At the same time, the general behavior of quasi-OS would be controlled by the service applications.

The client's quasi-OS and the application would be in a symbiotic relationship the application tells the quasi-OS what to do, and the quasi-OS determines how it should be done. While the quasi-OS does not have any useful function or behavior of its own without the applications, the applications are unable to get anything done without the quasi-OS I/O and control services. All the hardware/OS dependent functionality is encapsulated in the "front-end" of the quasi-OS and all the logic/behavior of an application is encapsulated in the application code. The two cooperate with each other through an OSSI communications protocol (which itself uses an underlying transport protocol). Thus, the application never executes any low-level code, instead it "asks" the quasi-OS to perform that operation on its behalf. In other words, the quasi-OS does not perform any operations which have not been requested by a remote application (exception is file maintenance operations when requested by the client user).

Existing applications which already have been written for specific platforms, such as UNIX/X and Windows 95/NT, can be easily converted by using libraries which utilize the OSSI for generating command packets, while maintaining conventional UNIX/X or Windows APIs (application programming interface).

In addition, disk space on the client no longer has to be wasted with hundreds of megabytes of OS files and application code, since only data is stored therein. At the same time, the server does not have to store any user data or make backups. Also, the user no longer has to worry about upgrading his or her application software, since this maintenance problem completely passes to the software vendors. Further, upgrading is easy for the software vendors since they need to upgrade only one application per server which they can phase in slowly. With respect to companies wishing to purchase application programs, such companies can purchase the inventive servers having pre-installed service applications which can immediately service hundreds to thousands of clients. Hardware requirements for the servers can now be drastically simplified, since either a CPU (general purpose or specialized) or a special processing chip having the appropriate memory in conjunction with the network interface (hardware and software) create a usable server. The present invention of reciprocal client-server operation can also be extended further even into operations of more conventional operating systems and computers to improve security, reduce obsolescence of hardware components, to improve abilities of mobile computing.

When the concept of private property was moved from the physical world to the world of information there was not much thought given to actual enforcement. Theft or destruction of information are not as easily proven and damages from such actions are difficult to value. Theft of service (where even copying is not done) where absolutely no tangible assets are damages or copied is almost impossible to prosecute. Since the actual wealth associated with information or ways to process information is entirely dependent on how many times the owner can actually convince someone to either copy the information or use the process, it becomes obvious that the idea of private property in relation to information or processes is not well-defined. And the conventional networks, computer systems and operating systems are not able to grant access to various resources in a refined fashion.

This inventive system and method based on reciprocal client-server operation aim to remedy the shortcomings of the conventional computer technology. The ownership of a resource can be understood only in the context of its utilization by others. The better one can control access to a resource the more of an owner one is. The more precisely one can determine what can be done with a particular resource, the more ownership value can be extracted from a resource. Ownership of a resource, access to which cannot be easily controlled, has no value. An owner's choice with conventional technology is to either grant nearly fall access to enable use or no access at all to maximize security; neither of those possibilities enhances the value of a resource.

The ownership is best determined not by who produced the resource but who can enforce how a resource is accessed and used. Therefore one needs to have a technical "guard dog" which allows a resource to be used in a certain way but restricts its use otherwise, i.e. a running application should be permitted to use certain logics and forbidden to use others.

In conventional computer systems/OSs (operating systems) security or access to resources is controlled by maintaining user and group identity. Particular users or groups of users can own resources which they and only they can access. For example, a file can be owned by a user "alex" and alex then has fall control over that resource, alex can modify or use or look at this resource as well as grant permissions to other groups to use this resource. However, the permission system is very crude and does not allow for any fine-tuning. Alex can, for example, allow himself the permission to write, read and execute (if it is a program file) but prevent members of his group (group "staff" for example) from writing into this file and all others who are not members of his group are not granted access.

The problems with this type of access control are numerous. Various systems based on user/group access are normally built around user passwords, i.e. a particular user has to demonstrate knowledge of some key word or a phrase to gain access. Password and key management are well known and serious problems in computer security, easily remembered passwords can be easily guessed and random or difficult to remember and data could be lost. If someone else learns of any user password then that someone gains full access to all the resources which are owned by user alex, i.e. the resource can be copied (copyright violations, business information can be compromised, etc.), the resource can be damaged (loss of business, recovery costs, etc.), or used without an appropriate payment (theft of service). A lot of time and money is spent managing group and individual security to tailor access to system resources with respect to conventional operating systems and computers. In the present invention access to applications can be anonymous since any resource coupled to the server is secured from damage or unauthorized copying by the client stations and all access is managed by the selected application. At the same time any resources coupled to the client station can accessed and used by applications are used only for the benefit and on behalf of the client station user and access to such resources can be tightly controlled by the client station. The client station user can use various security profiles for different applications to tell the client station software exactly which operations, at what time, with what data could be used with what application and server.

In order to enable maximum access by a maximum number of people for maximum efficiency but at the same time to maintain maximum security of the resource, access has to be granted on the basis of which application is being used to access the resource, how much this application is trusted, and which specific operations the resource owner is willing to permit on the specific resource (as an owner of a resource I may be willing to allow liberal append access but completely unwilling to allow anyone to read/write existing data).

If applications are stored somewhere on a network one can not automatically assume that they are trustworthy, therefore there is a need to design security profiles for each application. Whether an application is used remotely or actually downloaded into the client station the security risk for the client is the same, therefore all the operating system services provided for an application either via a network or directly by an operating system have to be appropriately restricted. A security profile determines which primitive operations (to access OS or devices for data and to control) any particular application can use and which specific parameters are allowed for each specific primitive operation.

For example, lets say an application wants to open a file. We can either forbid this operation to this application outright or we can restrict the file name space to something with which we the users feel comfortable, i.e. open("/home/alexo/somewhattrusted/application/*.txt","a"). So the only files this primitive is allowed to open is files within that specific directory and that specific extension and only for an "append" operation.

If it is not dangerous if a resource is read then there is no need to restrict any primitive operations which may read this resource. If it is not dangerous to allows one to write to a resource (writing to the screen for example) then the user may decide not to restrict those primitives which write to that resource.

If a user wants to use an application program on resource which he owns, the danger is that not knowing exactly what this application does internally can lead the user to damaging his own resource or inadvertently allow others either to damage his resources or obtain access beyond what was intended. So a user has to be able to restrict access not only by general access depending on the user or group but restrict access by individual application, by individual atomic (indivisible) operation, by time, by date, by file type, by name, by range of data which atomic operations may use, i.e. various parameters may be utilized to restrict execution of any individual primitive (atomic operations) logic. Also if a user is unable to restrict what actions a particular application can do then an application can be modified (or Trojaned) to violate security of user's resources. Since security of the conventional systems is based on ownership of a resource by a used or a group, there is no protection if a user himself or a member of his group runs a corrupted application.

Since every application has very specific needs, every application's profile can be tailored to reflect the application's needs and the level of trust a user has in the application. A clock application may be allowed to access primitive operations which are needed to display the clock face but would not be allowed to read the keyboard or access any storage devices or anything else which is not directly required. Therefore, if the clock application either inadvertently or on purpose is changed to do something else then the user would be alerted the moment one of the restricted logics is accessed and the security of the resource would then not be compromised.

Lets say that an application is a communications application, one of the primitive operations this application has to do is to reserve a port, the user then can restrict this application to a range of ports or a specific set of ports so that all other ports are always available for the user.

Client station includes application independent well defined set of logics which can be implemented as software, firmware/hardware or hardware only. The application independent logics such as file system logic, device control logic, user interface logic, communication logic consist of a finite number of further indivisible logics.

Each indivisible logic can be selectively accessed and individually controlled by an application running on a server computer.

For each application to which said at least one client station connects, said client station maintains information about which finite subset of the entire set of said further indivisible logics said client would process for said at least one application and which finite subset of said further indivisible logics would not be processed. Further for each indivisible logic, information about which parameters are allowed for a particular application and which are not permitted is maintained. Depending on how much trust one has for a particular application, i.e. if the application is completely untrustworthy then the client station may only allow this application to use those logics which display information on the screen and have no ability to either read or store data.

In case a particular indivisible logic is not processed then the client station notifies the client station user that said application program running on a server attempted to access and control said indivisible logic, and then said user can either allow said processing or refuse to allow said processing. If the processing is allowed, then the user can choose if such processing is allowed only this time or a permanent permission is granted.

Therefore, each application which can be accessed by said client station would have a profile of privileges stored on each client, said profile defining exactly which indivisible logics said application is able to use.

Therefore, if an application attempts to control/access logics which it is not allowed to access then said application is prevented to access and control said logics unless the station user explicitly overrides such a restriction.

The client station is also able to prevent access to a finite subset of said indivisible logics based on logical function of said logics, e.g. file system logic can be disabled in its entirety without regard to any particular application.

In addition, for each indivisible logic, the client station can maintain description of permissible range of values for the data which is used by the said logic. For example, if the particular logic is a file opening logic then the client station can insure that all the file names start with some prefix and end with some particular extension. For numeric parameters the client station can specify a range of values or a set of values.

The total set of the indivisible logics (or primitives) is subdivided into subsets by the security threat level (how much damage this primitive can do) as well as by function.

For example, some primitives may permanently modify the state of the client station; these are the most dangerous. Some primitives can simply access information from devices or storage which is less dangerous because no physical damage can be done by the system, but is very dangerous from the point of view of business information getting into the wrong hands. The last category is use or abuse of resources without paying for it or being a nuisance.

All the primitives can be further categorized into set (or groups) by their function, for example primitives which use printers, or primitives which display on a screen, or primitives which access storage devices. An individual primitive logic can belong to multiple categories.

A user would be able to turn on or off any particular group or set of primitives for use with any particular application. Depending on the priority of one or the other group overlapping primitives will behave as the group of the highest priority. A user can also turn on or off individual primitives as needed as well as determine valid ranges and values for data used by the primitive logics.

Therefore, said at least one user station includes the means for the user to create execution profiles for each application used or generic profiles for applications of a certain category. The profiles should include information about which primitive logics and with what data can be processed on behalf of said application.

The technique of controlling access to every individual logic can also be utilized even if one running an application directly on the general purpose client station by running an application inside a middle-ware software program which traps accesses to operating system services and checks for the security profiles.

Reciprocal client-server architecture can also benefit construction of operating systems by improve OS portability and computer security. Operating system software is a main program which runs on a computer with special privileges (it has fall control over all the aspects of the computer hardware) and its function is to control computer hardware as well as arbitrate access to different resources between multiple applications (which could be either OS applications or user applications) and between users (if it is a multiple user operating system like UNIX, VMS, or NT). Of course arbitration between users is really arbitration between applications which the users run.

Since the conventional construction of this type of software makes this operating system software monolithic, it is very difficult to implement security measures as far as access to various parts of the operating system program (kernel) code and memory space. The monolithic construction of OS kernel makes the software vulnerable to computer viruses and access by unauthorized parties.

At the same time, monolithic OS kernel software is very difficult to port to new CPUs since every new type of hardware requires substantial human effort.

In a further aspect of the invention, it is proposed to modify the way operating system software is designed and operated as follows.

OS software should be designed preferably as two (2) separate and distinct (kernels) programs (although it is possible to go further and subdivide an OS into more pieces, it does not achieve any additional benefits and may complicate design rather than simplify). One part of the operating system would deal with user interface, input/output, storage and other device dependent tasks and the other part would deal with loading and managing user processes (applications), providing access to the first part's interface by user processes (applications) as well as arbitrating this access, managing user process's memory, responding to events arriving from the other part of the OS and passing the appropriate messages/events to various user processes.

An interface designed for two parts to communicate with each other is a finite set of primitive, indivisible logics is implemented as part of device control of the user console by application processes. This set of primitive logics is called operating system services interface (OSSI) and is a protocol which utilizes some standard transport protocol to affect the actual communication of data packets. Within an operating system designed as two distinct logical programs, the user interface can restrict access to the primitive logics by the other part of the operating system depending on what application is requesting service.

So to summarize, this new addition is a separation of OS software (kernel) into two distinct parts. One part is responsible for controlling devices on a computer and the other part is responsible for running various user processes. The two parts communicate to each other through the OSSI protocol. Since the part which loads and runs user processes is peripheral device independent, it can be easily ported to any CPU or specialized processing chip with RAM. By running the two parts separately on two different computers (or more specialized devices), connected by a network, it is possible to run user applications in one place and have their effects manifest themselves on another machine.

It is also possible for multiple CPUs of same or different architectures to share operating system services of the device controlling OS kernel via utilizing OSSI protocol.

Although there are a lot of different hardware architectures basically all conventional hardware architectures have several things in common. A processor with some memory (memory is usually attached through memory management unit or MMU), a bus and peripheral devices connected to said processor via said bus. This type of conventional architecture uses the main CPU to perform computation as well as control said devices attached via said bus. The entire memory is accessible to the processor and every attached device can be controlled by the processor. In addition, the CPU, the memory and all the other devices are usually housed within the same chassis or enclosures. If a CPU or memory need to be upgraded, it is common that the whole computer is discarded although most of the peripheral devices could perform their task for many years to come. It is also very wasteful that there is not a kind of inexpensive user console hardware which can either connect to a network and use computational resources of the network as well as being able to connect to local computational resources securely.

By running an application on such a conventional hardware machine, the application is essentially given full control over all the hardware resources, i.e. there is no easy way to determine which resources can be accessed and which should be off limits. It is very common for computer users to run applications about which said users do not have complete knowledge, therefore enabling viruses and trojan horse programs to be run on the computer.

Reciprocal client-server computing architecture is also applicable to designing new type of computer system as follows.

To reduce obsolescence of peripheral devices and chassis and other hardware components and to maintain high levels of security of all the IO devices and storage devices, a conventional computing device (conventional computer) should be substituted by a computing device consisting of two separate enclosures (units). The two separate units then interact with each other according to the reciprocal client-server architecture model as discussed earlier in this application.

The two units do not share either program code memory or data memory, the interaction between the two units is conducted through the operating system services interface protocol. This protocol defines a finite number of commands which the user console unit can understand and act upon. The user console unit can also restrict processing of commands depending on many various data available to it.

One enclosure containing all the peripherals like storage, I/O, data acquisition, user interface devices and the second unit containing the CPU, RAM, devices needed for execution of applications. The two units would be physically connected by some network or wire or a bus (like SCSI for example or a wireless connection) to exchange information via using OS services protocol. By separating a computer into two distinct units one can substantially reduce obsolescence of either of them. Since biological abilities to see, hear, feel, smell, etc. do not evolve quickly, the front-end unit designed to interface with the user can be used for a very long time, while the computational unit can be upgraded as needed. It also would be possible to change the CPU unit or even have multiple (with different architectures) CPU units attached at the same time and running applications at the same time. The distinction between a local application running on your "desktop" and an application running remotely elsewhere then disappears as in both cases the same operating system services protocol would be utilized to enable an application to use the front-end user console operating system services.

By using a common transport protocol (like TCP/IP) to connect various devices within a single computer (or physically local set of devices) one can extend the life-time of computer equipment and make these equipment more general, i.e. easy and inexpensive processor upgrades, the same front-end unit can talk to CPUs on the internet, intranet, extranet, or the CPU on your desk.

Networks are not 100% reliable. In fact, communications between computers fail on a regular basis. If the application being run over a network does not take a long time to execute, then one can always rerun the application. If, however, failure of a network would cause a loss of time and money for rerunning the application, then there is a need to preserve the current state of an application at regular intervals of time and when some other special events occur. If one of the machines(or devices) running a part of an application needs to be powered down for maintenance, we want to be able to relocate that part of the application to another machine or at least preserve its state so that it can be restarted later. Most companies and individuals do not have access to fault tolerant technology for either their computers or the network; and if the internet is used then reliability of your connections depends on third parties and is out of your control.

Therefore to overcome the problems with network failures and the need to move parts of distributed applications/programs from one physical machine to another, the following inventive system and method are proposed. It is proposed that various parts of a network application collect various data about their internal state. These data collection can be triggered on a regular basis by a timer and/or by some event like receiving a communication or signal from another part of a network application or operating system. Upon receiving some communication instructing a particular part of a network application to preserve its state, the application proceeds to create a data object with complete information about its internal state. The application for example could preserve its stack space, program pointer and all other data which corresponds to its current state, it then may possibly compress this data, it may possibly encrypt this data, and then sends this data to an agreed location. The file with the data representing the state of the application is a check-point file. The application then may continue, or may be suspended, or it may be terminated so that it can be restarted at a later time.

In case of a reciprocal client-server architecture as described in the parent application entitled "Secured System for Accessing Application Services from a Remote Station" the application running on an application server collects data about its internal state and then saves this data by transferring it to the client station attached to it for future use. Each client station receives a state of an application specific to the client station's data and state of the application at the time of check-point creation.

Elaboration on Encrypted Check-point Files.

To preserve the state of the application from time to time preferably on a regular basis (based either on timers or other events like user's input) information about the state of an application can be collected and transferred to the client (desktop) machine for preservation. If an application server crashes or the network is down then the work performed so far by the application can be preserved. When the client machine later is able to reconnect to the application, the existence of a check-point file can be detected and the application can be restarted from the last check-point. A user can potentially force creation of a check-point file in order to transfer his desktop to another physical location and restarting the application from the same point. Note that under our model, there is no need for the application to continue to run on the server wasting memory and computational resources (while the desktop is disconnected). Therefore a user can run his application to a certain point, force the application to preserve its state, fly 3,000 miles and then reconnect to the same application and restart it from the same place. If the application is idle for a long time (the appropriate period of time can be determined by the server's administrator) the application can be directed to collect its state information, to send the state information (check-point data) somewhere else for preservation and then terminated in order to preserve the server's resources for active applications. Of course in the reciprocal client-server architecture network the state information would be sent to the client station for preservation either in its memory or some storage device.

Check-point files have to be encrypted by the application server to prevent tampering by a rogue user. The server encrypts the application state information(file) with a symmetric key and never reveals to another party (especially the client) what that key is. Therefore, only the same server (possibly only the same application) is able to decrypt the information to restore the original application process to the identical state.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE INVENTION

Figure 1:
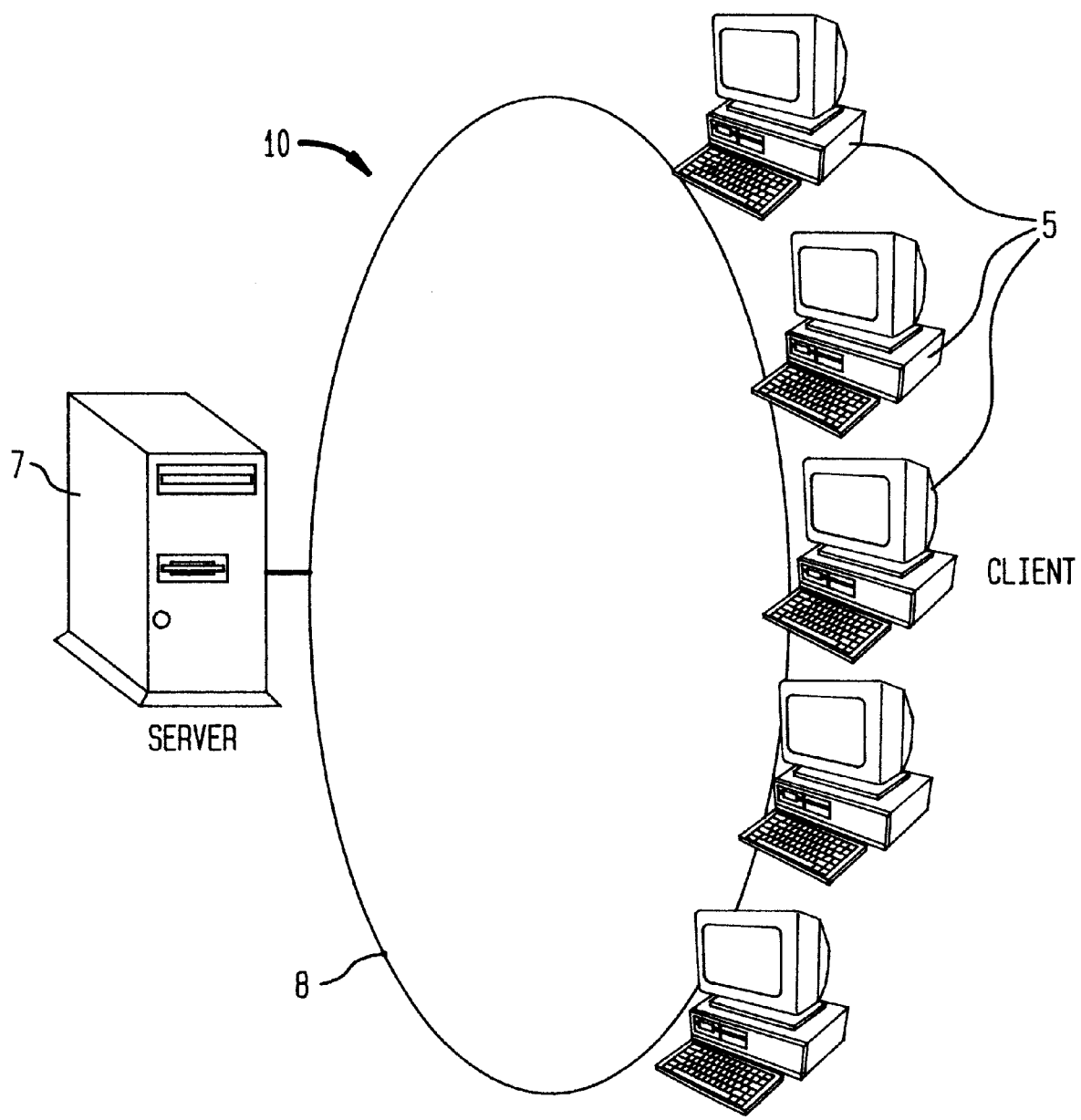
FIG. 1 schematically illustrates a two-tier network having a server, transmission medium and a plurality of clients.
Figure 2:
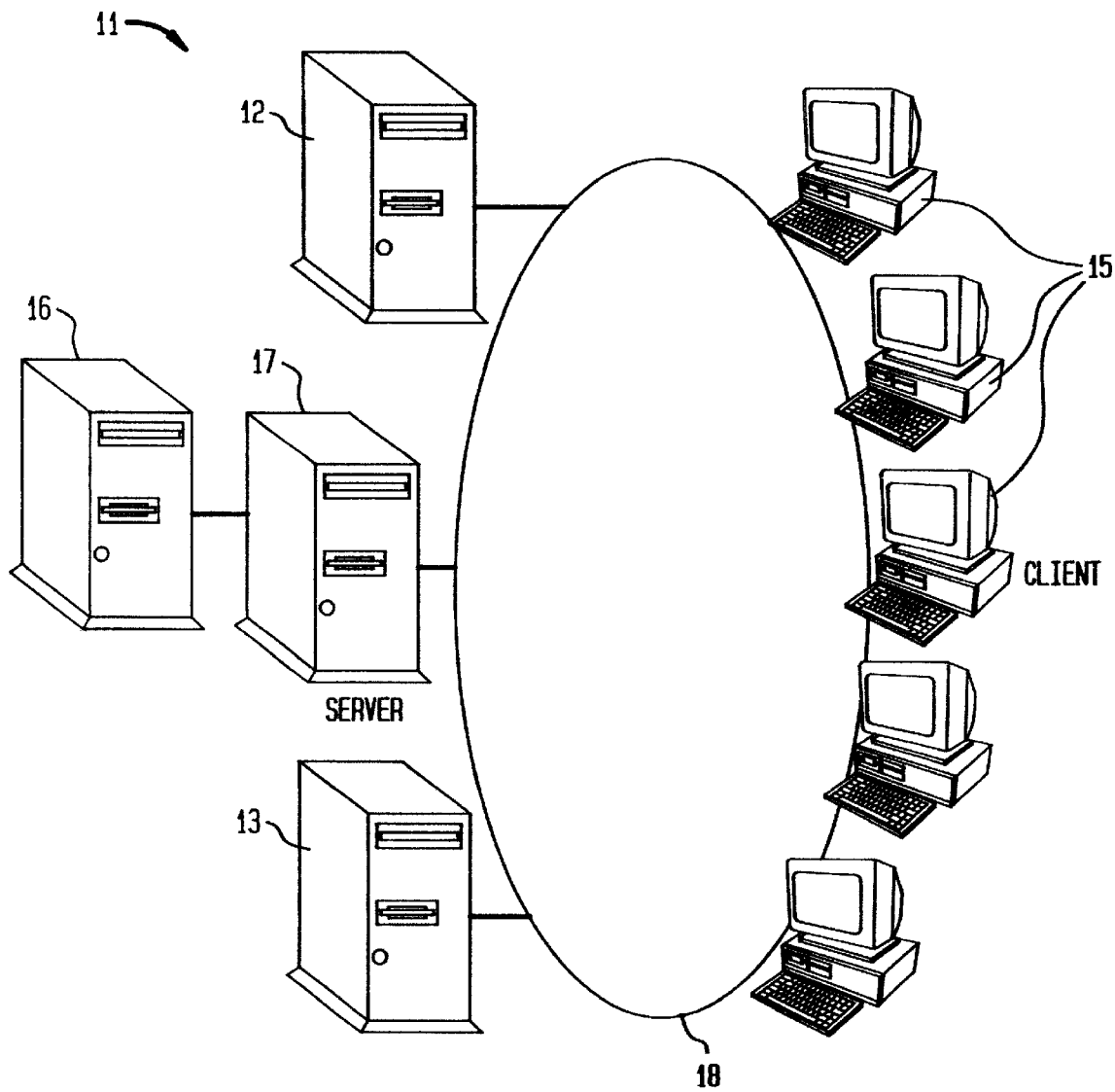
FIG. 2 schematically illustrates a reciprocal client-server network having a plurality of compute-servers, a file server, containing application program code, attached to one of the compute-servers, transmission medium and a plurality of clients in accordance with the present invention.

Referring to FIG. 2, the inventive system 11 comprises a plurality of specialized application servers 12, 13, 17 connected to a plurality of clients 15 over shared transmission medium 18. File server 16 contains application program code for application server 17. As with network 10 of FIG. 1, the system 11 is applicable to supporting the transmission of data on a LAN or WAN system. In general, each client serves its monitor, keyboard, mouse, file system, and other I/O and desktop attached peripheral devices. The servers serve their corresponding compute-power, application logic and control the I/O and other devices of the clients.

Each server is typically supported by an independent vendor to run their software application programs, as desired. For example, server 12 may be supported by vendor A for running word processing applications, while server 13 may be supported by vendor B for running engineering type applications. Further, one server may support service applications from different companies but which run similar applications. That is, server 12, e.g., may be supported by a service provider which will host multiple software vendors' applications relating to spreadsheets. Of course, service applications running on the same server need not be similar at all.

Server 16 is shown connected exclusively to server 17 and acts as a file server. File server 16 stores and boots the selected application program, as instructed by computational server 17. For example, file server 16 may be considered a so-called super-client that injects the selected application to compute-server 17 and then disconnects from server 17. This setup is preferable, as it adds a level of security from a client that connects to server 17 with the intention of corrupting the applications.

Each client 15 is preferably not a general purpose PC but an inexpensive and highly robust data-acquisition device. Thus, a client does not require a conventional CPU, such as a Pentium, PowerPC or Alpha chip. Nor does a client require a conventional OS, such as MS-DOS® or Windows 95. Instead of a conventional general purpose CPU, inexpensive but powerful controller circuits will be utilized for controlling the storage devices and other I/O hardware. An example of a possible controller is a TI TMS320C4x or C3x DSP chip. The controller or a plurality of controllers will control the client file system (file I/O logic) and low-level graphical user interface logic (e.g., GUI). For example, each client may have a separate controller chip for the file system/disk controller block, the communication block and the display/human interface block of the client, or one DSP control may control all three blocks.

Since the functions of the file I/O and graphical interface logic are well-defined and understood and do not have to be changed for different applications, they can be highly optimized in machine language for the highest speed, and will be provided as firmware in the client station's ROM, rather than software as is conventional (since conventional OSs are programmable). In fact, most of the functions could be cast in hardware like ASICs. It should be understood that general purpose computers will also work with the present invention (with little or no modifications), such that existing owners of PCs can access any specialized server to spawn a selected application, as desired. In such a case, the quasi-OS is replaced with the front-end "compute-browser" which has to be ported to the general purpose computer's OS (Windows 95/NT, UNIX, OS2, and the like) like any other program and runs as a user process under the regular operating systems mentioned above. This "compute-browser" would then utilize the host OS resources to control local devices on behalf of the remote service applications. Further, non-specialized servers having conventional application programs stored thereon may be utilized via the use of a "directory" service application, while the directory service application would provide the service to the client but may use one or more conventional programs to perform its tasks. Conventional applications can also be easily modified into service applications by recompiling and linking them with new startup code and new I/O and OS libraries.

Referring back to the specialized clients, instead of a conventional OS, a low-level "quasi"-OS, such as one whose graphical user interface is based on the X11 protocol (X11 is in the public domain), modified for data compression and encryption, will be stored in the ROM of each client. The quasi-OS essentially acts as a driver to perform tasks specific to the client hardware, as well as being the basis for the windowing structure. Note that the quasi-OS executes no application logic and can not load or run any client user processes.

Since these specialized clients require no conventional CPU or OS, they are inexpensive to produce and sell, and are far more robust than conventional general purpose PCs. Since these clients offer a longer useful life than general purpose PCs, or other desktop workstations, the cost of the client may be amortized over longer periods of time, further decreasing the overall cost of the client. Faster CPUs and extra memory are not required in the specialized clients since even when service applications become more complex, the applications are still run remotely on the corresponding server, instead of being loaded and processed on the client.

Further, since the client station does not need to contain specific conventional OS platform, the applications running on the servers only need to be concerned with using a standard Internet protocol, such as tcp/ip and OSSI higher-level protocol for the command packets. Thus, the only compatibility required between each client and the server application is file format compatibility. As will be described hereinlater, since the data in the client file system will typically be created by the application itself, compatibility is not a concern.

Now, instead of a software vendor selling different versions of their application programs to run on the different available platforms, only one version is typically resident on a server. Since the applications are compatible with the client file system (in fact, the applications do not need to know the internal structure of the file system since the quasi-OS will handle the interface) and the quasi-OS, any specialized application will operate with the client, such that an unlimited number of different applications could be accessed by from each client connected to a server or to multiple servers. The client can serve its peripheral devices to any number of service applications (according to their commands), and to any number of specialized servers.

Such inventive servers can have different hardware architectures without concern for what OS the clients are running or what devices they use. Therefore, software vendors have complete freedom to design machines and software for maximum speed and flexibility. In fact, servers may not run any OS at all but run directly bootable service applications. The software vendors also will not have to deal with compatibility concerns, save tcp (or udp)/ip and X11 protocols. By using OSSI compatible libraries, the software is automatically compatible without any source code modifications.

Each client need only comprise one or more storage devices, such as a hard, floppy, or CD-ROM drive. As stated, each client preferably also comprises a file system. The client storage system may also be separate from the client (not shown) by use, e.g., of an attached file server. If the client does not have any storage device attached, then the only applications which can be used are those which required no storage facilities, such as html browsers. The files in the file system include a configuration file or database which tells the client quasi-OS where on the network (LAN or WAN/Internet) to connect and to which port to obtain a connection to a specific service application. Further, the file system includes data files storing data corresponding to each previously spawned application, as well as check-point files representing the state of the program when the connection is terminated for each application. Check-point data can generated on a regular basis based on time, by events occurring on a client station, if the application idles for too long, etc . . . The check-point files allow recovery in case of network failure, server failure, however, the check-point files need to be encrypted by the server to prevent any tampering by the clients. Check-point data can also be used to relocate a client station and then to restore an application which was being used to the same state it was before such relocation took place. In addition, the file system temporarily stores any work-space files that the service application may require.

Accordingly, all of the client user's data, corresponding to each spawned application, is stored locally to the client station, such that when the client station is disconnected from the network, the user's data is incorruptible by anything else on the network. Compare this to systems wherein the data is stored in a central server file system. In those systems, the data is subject to corruption by malice or mistake.

Further, each client also includes low-level graphical interface logic(or at least some user interface) so that the client user can select which server applications to launch. This non-general purpose client performs no high-level logic functions. Preferably, the only functions permitted would include directing the peripheral devices to attach to requesting service applications, making data backups, displaying, and opening, renaming and deleting data files, but would not include any processing of such files. File maintenance operations should be embedded within the quasi-OS and perform only pre-determined well defined tasks. File maintenance operations, built into the quasi-OS, can not be initiated by any remote service application but rather may only be invoked directly from the quasi-OS by the client user. File maintenance may, however, be performed by the servers to the extent permitted by the quasi-OS without involving its internal maintenance functions.

Each client station may optionally contain plug-in I/O modules such as a frame grabber, an audio/video interface, a digital-to-analog and analog-to-digital converter, a microphone, a camera, a compression board, a temperature probe, a humidity probe, an encryption chip, or any other device, as desired. The server then, via the application program, controls the clients's I/O devices (as well as the client's file system, etc.) by sending appropriate command packets to the client quasi-OS. The client station is able however, to choose which command packets would be processed and which ones rejected. Further, as stated, each server may include any specialized hardware for running its applications or services without compatibility concerns with the client.

For example, a movie editing server may include all of the expensive hardware editors connected to the server. A movie studio may then have a client station, having a video camera I/O device. The film on the camera can then be edited via the editing hardware on the server without having to purchase their own expensive editing hardware. Thus, the application would control the data feed from the camera, edit the transmitted date on the resident editors, and transmit back the edited data to the client for storage on the client's disk for immediate display on the client's monitor, or for printing on the client's printer or for output to a CD-ROM, a DVD disk or a video tape.

The operation of the inventive system will be described below with reference to the flow chart of FIGS. 3A and 3B. However as a precursor, note that the client acts as a window on the world for the selected applications, while the client user selected application runs on the corresponding server. In other words, the client is a "human-machine-interface" (HMI) for the servers. Upon authorization, the application accesses the client's file system to retrieve the user data for processing. Note that the application controls all of the operations and controls all of the peripheral devices on the client, via the quasi-OS.

For example, all of the I/O modules (such as a floppy drive) are controlled remotely by the server application. Once the application is complete or during the run of the application (as data needs to be read or written), the processed data is transmitted to the client file system for local storage on the client. Since the application's program code does not get transmitted to the client (like in JAVA or ACTIVE-X objects), the user can not copy the code. Accordingly, software vendors can easily go into China, Hong Kong, Korea, Eastern Europe and other markets where software piracy is wide-spread (as high as 98%) and offer these compute services without piracy concerns.

As stated, the inventive system differentiates between data and program code, i.e., the client file system is intended to store only data for the remote server, never their application program code. The program code is loaded into the servers from their own private file system (inaccessible to clients) or from a corresponding file server (whose function is limited to carrying the program boot code but can not run the application) for added security. The only exception to this separation is when executable files are themselves program data as in a situation where the application is a compiler (or linker), but the compiler-server would be cross-compiling for a different architecture. The resulting programs can not run on the client and should not be run on the compile-server (for security). Rather, the resulting program should be run on a separate execute-server which has the appropriate CPU and software to remotely load and run the program. In general, note that the server that runs the application should be different from the server which created it. An execute-server should be able to accept program code over a network connection and load this program code in its memory for execution.

Figure 3A:
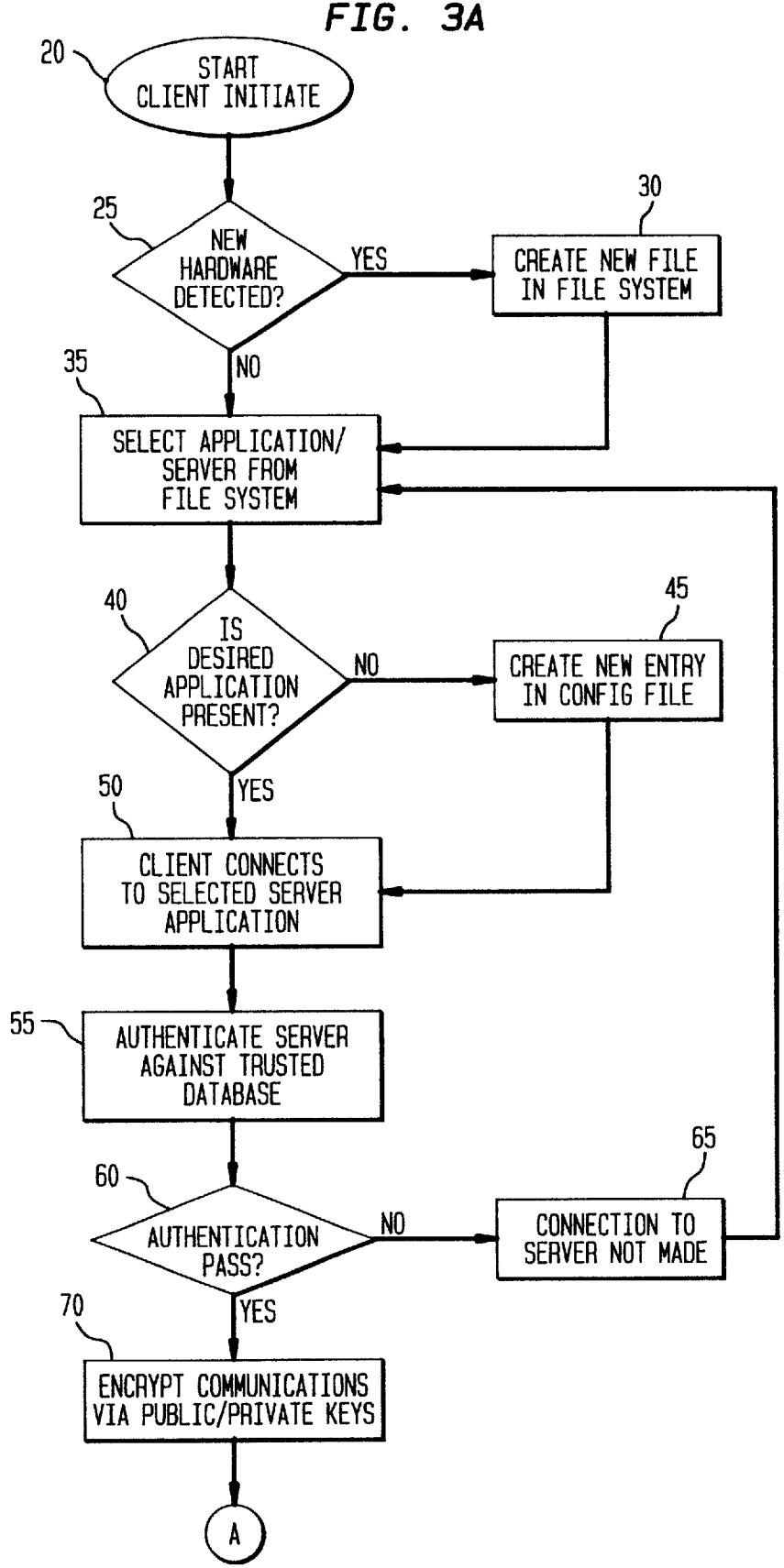
FIGS. 3A and 3B are flow charts showing the general steps for accessing and using an application on a server from a remote client.
Figure 3B:
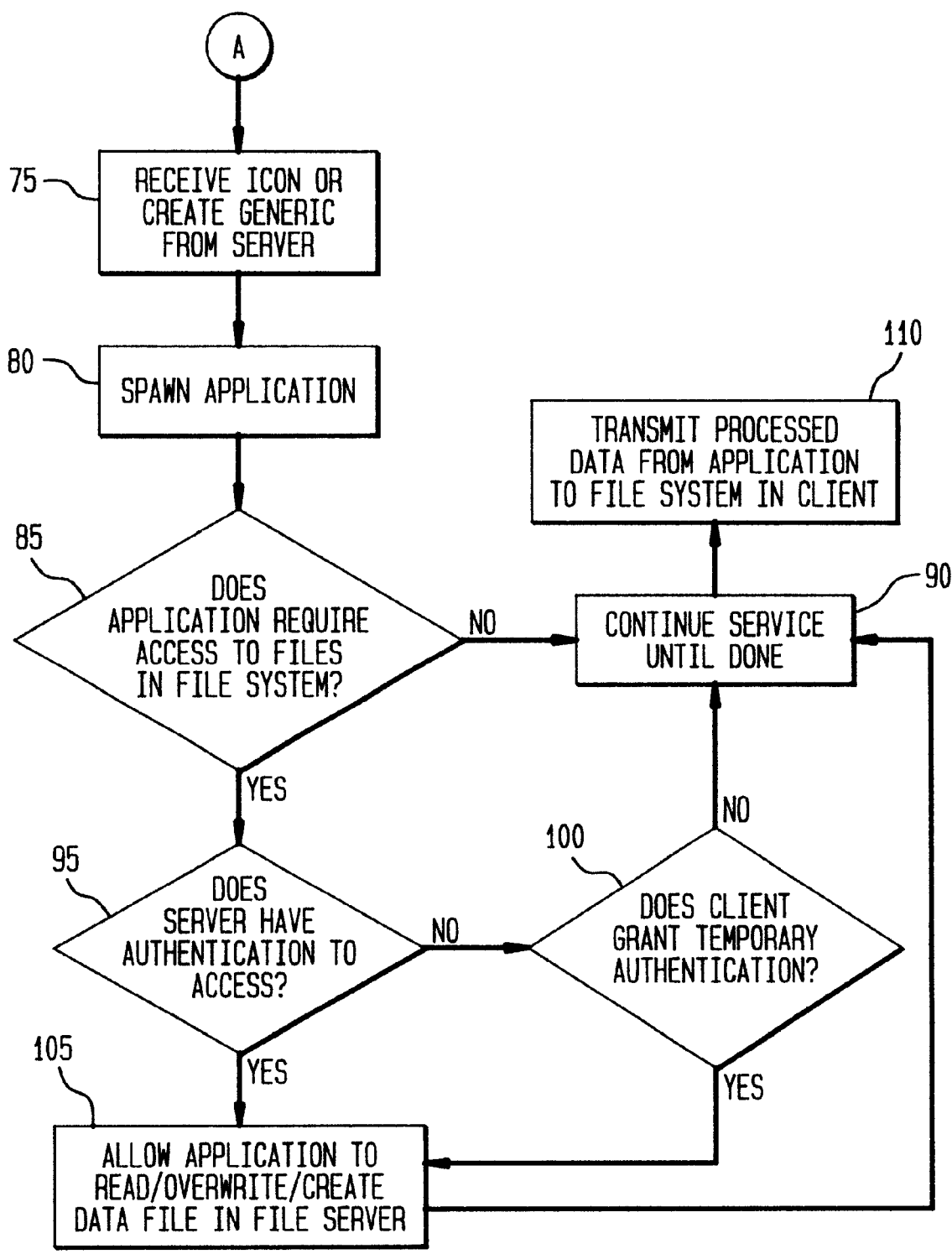
Figure 4:
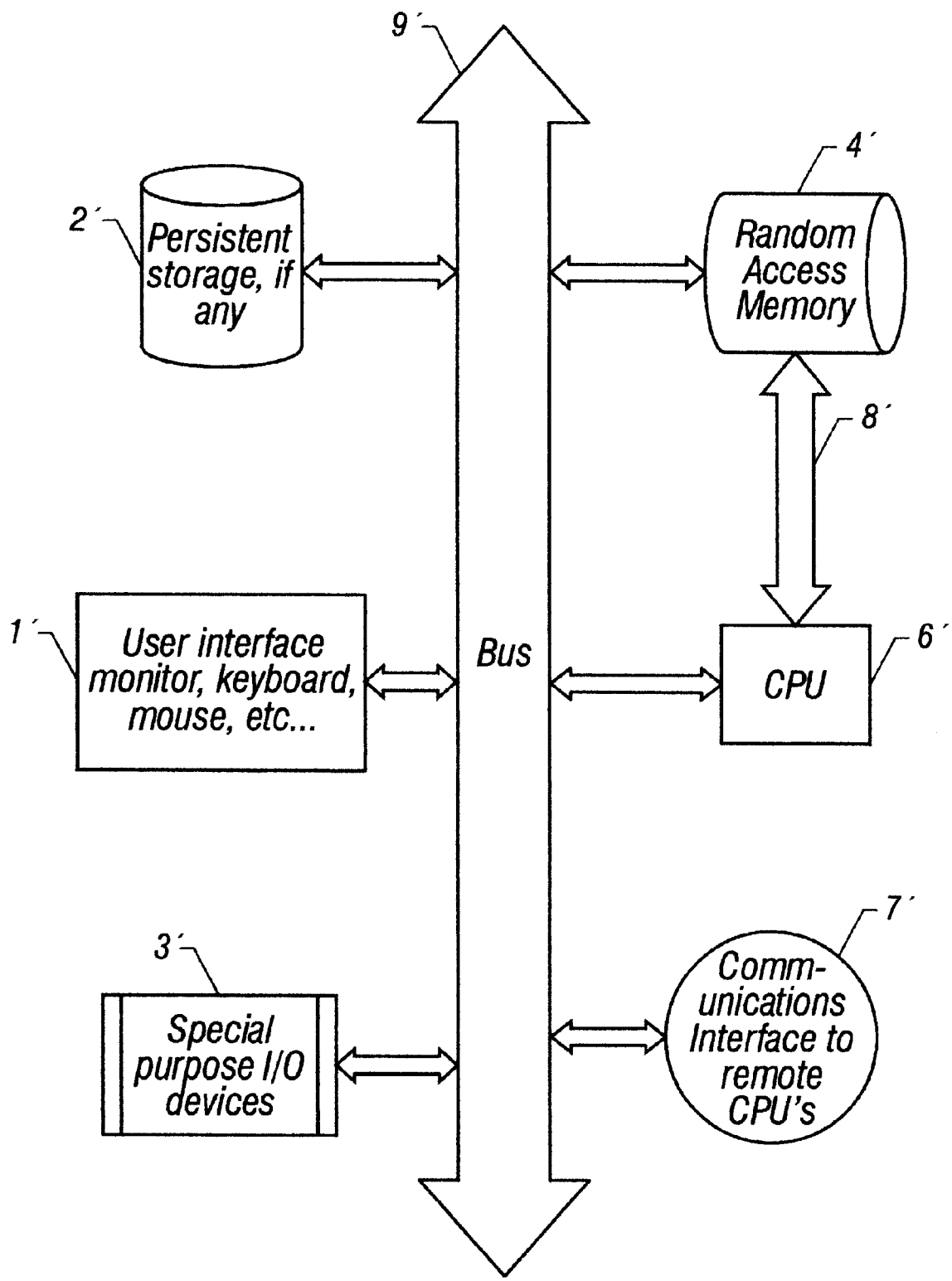
FIG. 4 schematically illustrates a conventional computing device (computer) with a single bus for communications between peripheral devices and CPU and memory. Random Access Memory is shared by all the devices and CPU to perform their tasks.

FIGS. 3A and 3B show a flow diagram providing the steps for accessing and spawning a server application from a remote client. At step 20, a client station is powered on which initializes the network, the user interface, and the file system modules from ROM. The network module initializes the communication interfaces, such as for an attached modem, ethernet, ATM, cable or fiber optic connection. Further, a multiple network interface may be available to the client, i.e., the client may use an ethernet system for the intranet but a cable modem for the Internet. Servers may be accessible simultaneously through all available interfaces. If one of the interfaces is a regular modem, then a telephone connection is made with the ISP to establish a connection. PPP, SLIP or other point-to-point transport protocols can be used. The user interface modules initialize the display, keyboard and the like. The file system module initializes the file system comprising the service application information (previously spawned applications, networks, servers and ports) and related program data stored on the client storage device.

At step 25, the client detects whether any new hardware is present. Such hardware includes any added peripheral devices discussed above. If any new hardware is detected, a corresponding device file is created in the file system for controlling the device at step 30. If no new hardware device is detected, the process precedes to step 35 where the client makes connections to all the servers and applications which have been stored in its resource configuration file/database.

At step 40, if the application location (i.e., server IP address and port) which the user wants to spawn was not previously stored in the configuration file, then the client user creates a new entry in the "config" file, at step 45, to include the server and application address (port). However, if the desired application entry is present in the resource configuration file, the client connects to the appropriate address to connect to the selected server, at step 50. If the configuration file is not present, then the client user has to enter the appropriate IP address and port by hand. Once entered, this information can be saved for future use in the configuration file.

At step 55, the server is authenticated against a trusted database. Simply put, the server may be authenticated by transmitting a predetermined data string. At step 60, if the authentication of the server fails, then the connection to the server will not be made, at step 65, and the process returns to step 35, where the client quasi-OS will try to connect to other servers/ports in the config file or the client user may select a different server application by hand after all the entries in the config file are exhausted.

At step 70, the client receives a public key from the server for encrypting the client's own private key and transmits the encrypted private key to the server. The server then decrypts the received encrypted private key with its own private key.

Thereafter, all communications between the client and server are secured by using the client's private key. The client may generate a new key every time the client connects to a server or generate several new keys during a single connection for extra security. Special encryption hardware such as diodes could be used to generate random bit patterns to be used as the client's private keys.

At step 75, the server or a linked directory service application transmits graphical icons to the client representing the server's available applications. The client then dynamically builds a window containing each application icon. If, however, no icon is transmitted from the server (one is not available), then the client will generate a generic icon for selection purposes. At step 80, the client user will "click" the desired icon to spawn the corresponding application program. An application can also be started by "dragging" a data file and "dropping" onto the application icon. The client user may also directly access an application by typing in a unique service name at the command prompt, which is then looked up in the client's resource configuration file/database and the client then requests the directory service on the corresponding server that the respective application program is spawned.

At step 85, it is ascertained whether the server application requires access to any data client files in the client file system. For example, if the client connected to (spawned) a word processing application for editing, then the application would require the text data stored locally in the clients file system. If the application does not required any access to the client files, then the service continues, at step 90, until the user is done. During the service, the application may also control the client's peripheral devices via the quasi-OS, as previously discussed. The application normally receives the file names it needs to use from the client user as parameters or it is entered interactively by the client user after the application was spawned.

If the application does require access to the client files, it is ascertained whether the server application has the authorization to access such files (even if the client user entered the file name by hand, the authorization step is still required to prevent the server from changing the file name), at step 95. Such authorization can be set up previously by the client user as a "rule" based permission system to grant authorization to a specific server every time (or until the client changes the authorization) or to grant authorization per single use. A rule based restriction may be based on the data file type, the application, the server, the access requested and the date. In addition, access by a specific application may be restricted to only a specific set of files by name or directory. Thus, every time the client accesses the server application, the client user would have to re-authorize such access. Even if authorization is granted to a server, there are different authorizations which may be given to each server. For example, anyone or all of the following authorizations may be given: "read", "write", "append", and "create", etc . . .

If the server does not have authorization to access the files in the resource configuration file, then the process proceeds to step 100 where the client user, as stated above, chooses whether or not to grant a single use authorization. If the client user does not grant authorization, then the process proceeds to step 90 where the service will continue until done or the server application may decide to terminate. If the client does grant temporary authorization or the server/application had a predetermined authorization, then the process proceeds to step 105 where the server application is permitted to read, write, append, rename, move, or create the corresponding file in the file system, as authorized by the client user. The client also has an ability to substitute one file for another. If the file requested by the application contains information which the client user does not want accessed, the user may substitute another file for it and the application will not know anything about the switch. This will allow the client to "remap" file names which have been hard-coded into applications.

During the service, the quasi-OS may react in three different ways to application's request to perform a particular operation: 1) it may perform the operation and notify the application of success, 2) it may not perform the operation and notify the application of failure, 3) it may not perform the operation but still notify the application of success. The third option would be useful to allow the remote application whose "commands" are either inappropriate or violate security to proceed without immediate failure.

From step 105, the process proceeds to step 90 where the spawned application will continue running until the client user is done. Lastly, at step 110, the processed data from the server application will be transmitted, if necessary, to an appropriate file in the client's file system. If the application was updating the data file as it ran, then the file would simply close.

Figure 5:
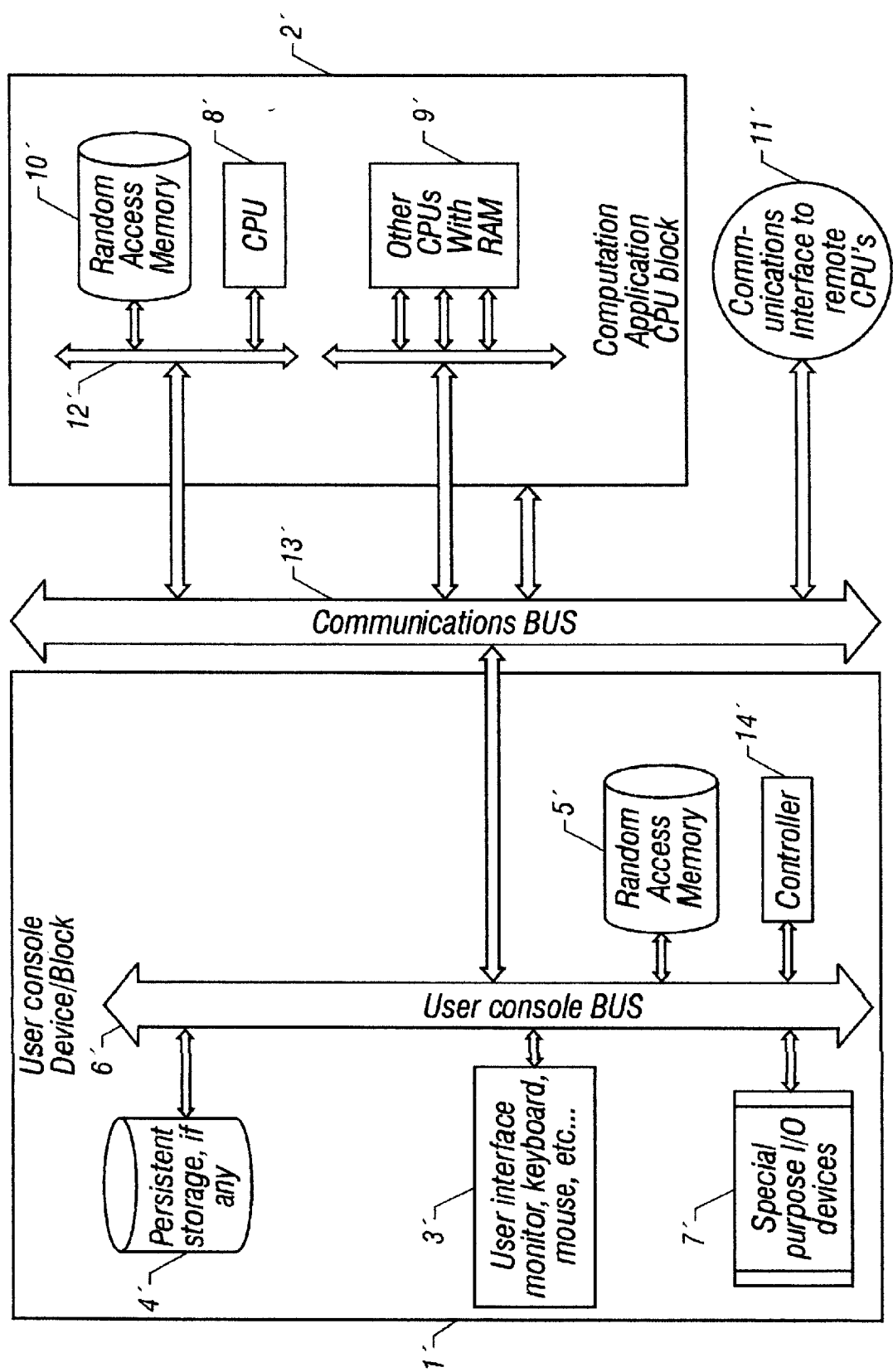
FIG. 5 schematically illustrates a computing device constructed from two distinct functional blocks, user console device block and computation/application block. User console device block has a separate controller for performing its tasks and its own private memory, while CPU/application block has its own processor(s) and its own private memory to run applications and processes in accordance with the present invention.

Referring to FIG. 5, the inventive system comprises of two functionally distinct blocks: user console device/block 1 and computation/application CPU block 2'. The two functional blocks are connected by a communication interface 13' which can be a bridge, bus, LAN, WAN, wired or wireless network.

The functional unit 1' comprises of a controller 14', random access memory 5', user interface devices 3', storage devices 4', special purpose and 10 devices 7. All the components of this first functional block 1' are connected by a bus 6'.

The functional unit 2' comprises of at least one processor 8' with some memory 10' connected either by a local bus 12' or MMU. Other processor/memory combinations 9' are also part of the computational block 2'.

The functional unit 1' also has a connection through the communications bus 13' to communications interface 11' to remote processors.

Each CPU 8' or 9' may have to be of differing processor architectures and may simultaneously run different applications. Applications executing on the computational block 2' on any of the processors 8' and 9' utilize, through communications bus (interface) 13' storage 14', special purpose devices 7', user interface 3' by controlling controller 14'. Controller 14' utilizes memory 5' for its operations but memory 5' is not directly accessible by applications running on computation block 2', nor is it directly accessible by application running remotely through interface 11'.

Communications bus 13' is able to accept a finite number of indivisible primitive commands, each command performing a specific function to control some part of the user console block 1', to retrieve data and store data from and to storage and special purpose devices. User console block 1' is able to restrict which primitive commands are performed on behalf of any application/processor depending on data provided to the primitive commands and depending on which application is requesting access as well as any other parameters which may be set by a user.

Applications running on remote CPUs and attached to user console 1' via communications interface 11' and applications running on CPUs 8', 9' use identical primitive commands to access operating system services of user console 1'.

CPUs 8', 9' may load operating system software, needed to run and manage application processes, from storage devices 4' of the user console block 1'. CPUs 8', 9' may also load application program code from user console block 1' storage device 4'. In other words, user console block may inject both operating system code and application code into local CPUs 8', 9'.

User console block 1' and CPU block form a reciprocal client-server architecture as described above.

Figure 6:
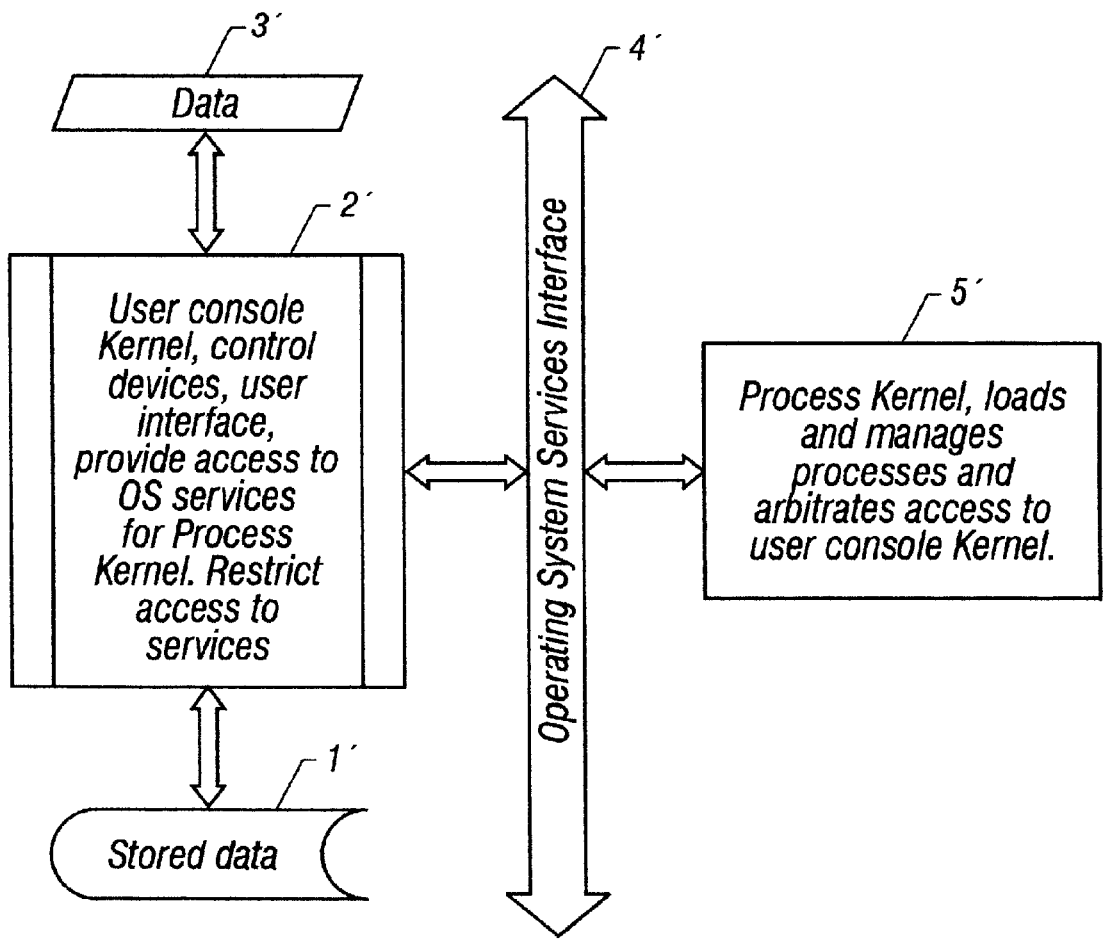
FIG. 6 shows separation of an operating system into two parts, user console part (2) and process kernel (5) connected via operating system services interface (4)
Figure 7:
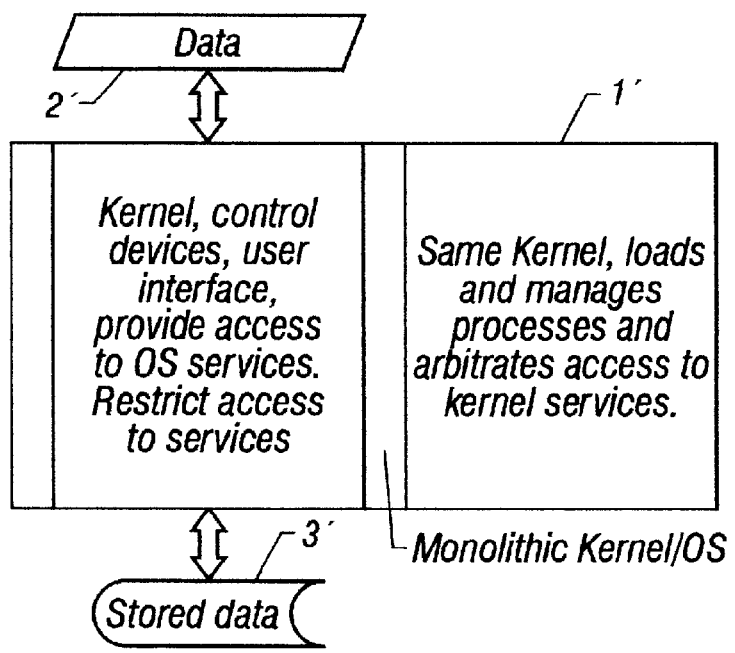
FIG. 7 shows a conventional monolithic operating system in which an application could potentially gain full access to all the resources controlled by the OS kernel.

Referring to FIG. 6, User console kernel (2') has access to and controls stored data (1') as well as is able to read or write data (3) from or to devices accessible from the controller where user console kernel (2') is running. Process kernel (5') is able to communicate with user console (2') through the operating systems services interface (4'). Operating system services interface (4') includes a finite set of commands which it understands. Process kernel (5') loads and manages processes (applications) as well as arbitrates access to user console part (2') between various processes it runs. User console kernel may restrict processing of various logics which are part of said user console kernel depending on any data which a user may choose, i.e. date, file type, security requirements, application, network, network address, etc. User console kernel (2') and process kernel (5') do not share each other's memory and can not access each other's memory except through the primitive operations of operating system services interface (4'). Process kernel (5') does not have access to either stored data (1') or to device data (3') except through operating system services interface (4'). Process kernel (5') may also be able to access stored data (1') to retrieve stored application code to run said application code under process kernel (5') and access data (3') and stored data (1') of user console kernel (2') by using primitive operations of operating system services interface (4').

Figure 8:
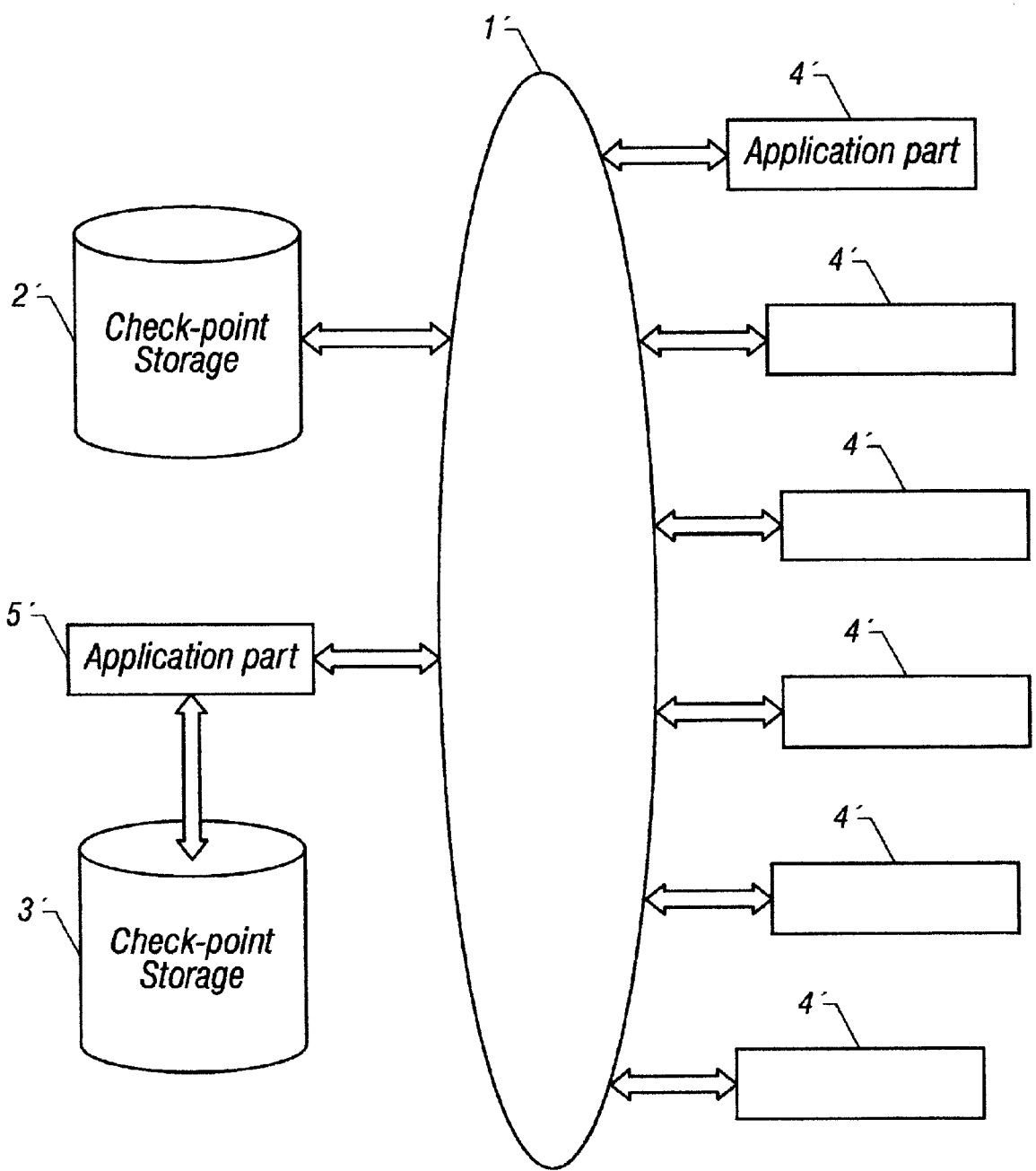
FIG. 8 is a schematic diagram illustrating a system for preserving state of an application program by storing checkpoint data.

FIG. 8 shows communications means (1'), check-point storage device (2') or (3'), parts of network application program (5') and (4'). (4') represents one or more distinct parts. From time to time, with the period determined by a user or by an application itself, various parts of a network application (5') and (4') examine their own state. After the current state of each part of a network application has been examined, a check-point data structure or file is prepared and stored either in some location connected directly to the network file (2') or one part of a network application (5') can collect all the check-point data from other parts of a network application and store all the check-point data in storage location (3') to which only this particular application part (5') has access. An application part (5') uses communications media (1') to obtain all the check-point data from other parts of the application (4'). Before check-point data can be collected, various parts of an application (5') and (4') have to be synchronized to be in a well-defined communications state, i.e. when the application is restarted from check-point files some applications parts should not be ahead of other applications parts. Besides being triggered by timers, check-point data collection can also be triggered by other events like user input (if a user wants to force check-point data collection) or it can be triggered by failure of communications or other events. Collection and management of check-point data can also be managed by a specialized program/server dedicated to management of check-point data. For example, (5') can be that specialized server instead of an application part.

In a reciprocal client-server architecture setting check-point data is collected by the client station program (let us say (5')). An application program (4') running on an application server can collect check-point data of its internal state at regular intervals of time and any time some special event takes place like user station sending a signal to cause check-point data collection. Then said application (4') communicates with the user station program (5') to preserve the check-point data within said user station. User station (5') can also preserve check-point data in storage not directly coupled to it, i.e. user station can store the check-point data in storage (2'). An application (4') can also be forced to collect its internal state data by the server OS/manager if the application is idle and the server needs to conserve memory and CPU resources for other users. In case the application is suspended because it is idle it could then be suspended or removed from memory. Later the application (4') could be restarted from the check-point data in exactly the same state as when it was removed. Once the idle application is removed from the server computer it no longer is able to use the server computer resources until the application is restarted again.

While several embodiments have been chosen to illustrate the invention, it will be understood by those skilled in the art that various changes and modifications can be made therein without departing from the scope of the invention as defined in the appended claims.

I claim:

1. A secure system for accessing application services from at least one application program, comprising:

at least one client station having application independent logics stored therein and at least one controller for controlling said application independent logics, said application independent logics including at least one of a user interface logic, a device control logic for controlling devices, a file system logic, and a communication interface logic;

at least one application server having application logic stored in a server device for running said at least one application program, said server device being coupled to said at least one application server; and an interface between said at least one client station and said at least one application server for connecting said at least one client station to said at least one application server;

wherein upon accessing by said at least one client station, said at least one application server runs said at least one application program which selectively controls said application independent logics for controlling devices of said at least one client station and for accessing data of said at least one client station, and wherein said at least one application server is able to process said corresponding data of said at least one client station on said at least one application program.

2. The system of claim 1, wherein said application independent logics consist of a finite set of further indivisible (primitive) application independent logics, wherein each said indivisible application independent logic can be individually accessed and controlled by said at least one application program.

3. The system of claim 2, wherein said at least one client station is able to restrict access to said application independent logics by selectively refusing processing of said primitive logics for said at least one application program running on said at least one application server.

4. The system of claim 2, wherein said at least one client station includes a means to associate a finite subset of said further indivisible application independent logics with said at least one application program running on said at least one application server, wherein said at least one application program is able to access and control said finite subset of said indivisible application logics and is unable to access and control other indivisible application independent logics.

5. The system of claim 4, wherein said client station user controls which specific indivisible application independent logics are part of said subset which can be controlled by said at least one application program running on said at least one application server.

6. The system of claim 2, wherein said at least one client station is able to restrict access to said application independent logics by restricting what data can be used in processing of said primitive logics for said at least one application program running on said at least one application server.

7. The system of claim 1, wherein said at least one client station has means to store the state of said at least one application program to enable said at least one client station to restart said at least one application program at a later time at the same point in the said at least one application program.

8. The system of claim 7, wherein said at least one application server encrypts said state of said at least one application program to protect said at least one application program state and to protect said at least one application server from corruption by said at least one client station by corrupting said state of said at least one application program.

9. The system of claim 1, wherein said file system logic includes a file system capable of storing data corresponding to said at least one application program.

10. The system of claim 1 wherein said at least one application server is able to process said corresponding data without having the necessity to permanently store said data in said at least one application server or in a server device coupled to said at least one application server.

11. The system of claim 1 wherein said at least one client station is able to restrict access to said application independent logics.

12. A computing machine comprising:

at least one user interface and input/output device (user console) having application independent logics stored therein and at least one controller for controlling said application independent logics, said application independent logics including at least one of a user interface logic, a device control logic for controlling devices, a file system logic, and a communication interface logic, and wherein said at least one user interface and input/output device has means to restrict access to said application independent logics;

at least one computational device having means to store application logic in said at least one computational device for running said at least one application program; and an interface between said at least one user console and said at least one computational device for connecting said at least one user console to said at least one computational device, wherein upon accessing by said at least one user console, said at least one computational device runs said at least one application program which selectively controls said application independent logics for controlling devices of said at least one user console and for accessing data of said at least one user console, and wherein said at least one computational device processes said corresponding data from said at least one user console on said at least one application program without having to permanently store said data in said at least one computational device.

13. The computing machine of claim 12, wherein said file system logic includes a file system capable of storing data corresponding to said at least one application program.

14. The computing machine of claim 13, wherein said operating system program code is retrieved by said at least one computational device from said at least one user console.

15. The computing machine of claim 12, wherein said application program is an operating system program to control said at least one computational device.

16. The computing machine of claim 12, wherein said operating system program is able to control said interface between said at least one user console and said at least one computational device.

17. The computing machine of claim 12, wherein said interface includes a common communication transport protocol.

18. The computing machine of claim 17 wherein said common communication transport protocol is TCP/IP.

19. The computing machine of claim 12, wherein said at least one computational device may select one of a plurality of operating system programs.

20. A secure Operating System comprising:

at least one user interface and input/output software module (user console kernel) having application independent logics and at least one means for controlling said application independent logics, said application independent logics including at least one of a user interface logic, a device control logic for controlling devices, a file system logic, and a communication interface logic, and wherein said at least one user interface and input/output software module has means to restrict access to said application independent logics;

at least one computational software module (process kernel) having means to run application logic for running said at least one application program; and an interface (operating system interface/OSSI) between said at least one user console kernel and said at least one computational kernel for connecting said at least one user console kernel to said at least one computational kernel, wherein upon accessing by said at least one user console kernel, said at least one computational kernel runs said at least one application program which selectively controls said application independent logics for controlling application independent logics of said at least one user console kernel and for accessing data of said at least one user console kernel, and wherein said at least one computational kernel processes said corresponding data from said at least one user console kernel on said at least one application program.

21. The secure operating system of claim 20, wherein said at least one user console kernel and said at least one process kernel run on separate physical devices.

22. The secure operating system of claim 20, wherein said at least one user console kernel program and said at least one process kernel program have private program and data memory and wherein each of them is unable to access said program and data memory of the other.

23. A method of securely accessing application services from at least one application program, comprising the steps of:

accessing at least one application server by at least one client station to connect to said at least one application program running on said at least one application server;

wherein said at least one client station has application independent logics stored therein and at least one controller for controlling said application independent logics, said application independent logics including at least one of a user interface logic, a device control logic for controlling devices, a file system logic, and a communications interface logic; and wherein said at least one application server has application logic stored in a server device coupled to said at least one application server, for running said at least one application program;

having said at least one application server selectively interact with said application independent logics to retrieve data corresponding to said at least one application program from said at least one client station upon optional authorization from said at least one client station;

processing said corresponding data on said at least one application program; and without having to permanently store said data within said at least one application server when said application services are complete.

24. The method of claim 23, wherein said file system logic includes a file system capable of storing data corresponding to said at least one application program.

25. A secure system for managing devices and/or file systems of at least one client station, comprising:

at least one application server having application logic stored within a server device coupled to said at least one application server for running at least one management application program, and said at least one application server being capable of accessing multiple devices and file systems, each coupled to at least one respective client station, when each client station interfaces with said at least one application server to access said at least one application program;

wherein each interfaced server selectively accesses said devices, said file systems or both to form a centralized device and file management system for controlling and accessing devices, file systems, states, or configurations of said at least one client station;

wherein upon accessing by said client stations, said at least one application server runs at least one application program and selectively controls application independent logics of said at least one client station for controlling devices of said at least one client station and for accessing data of said at least one client station; and wherein said at least one application server is able to process said corresponding data of said at least one client station on said at least one application program without having to permanently store said data in a server device coupled to said at least one application server or within said application server.

26. A secure system for accessing application services from at least one service application, comprising:

at least one client station having at least a special purpose operating system stored therein for supporting said at least one client station connections to at least one application server and application independent logics stored therein, said special purpose operating system comprising application independent logics including at least one of a user interface logic, a device control logic for controlling devices, a file system logic, and a communication interface logic, wherein said at least one application server runs said at least one service application which controls said application independent logics stored within said at least one client station for controlling said special purpose operating system and devices of said at least one client station; wherein said at least one service application is at least one of software service application or hardwired service applications.

* * * * *